(12) United States Patent
Marshall

(10) Patent No.: US 11,485,682 B2
(45) Date of Patent: Nov. 1, 2022

(54) COLLAPSIBLE ENGAGEMENT MECHANISM

(71) Applicant: Jordon Peter Marshall, Minneapolis, MN (US)

(72) Inventor: Jordon Peter Marshall, Minneapolis, MN (US)

(73) Assignee: Jordon Peter Marshall, Minneapolis, MN (US)

( * ) Notice: Subject to any disclaimer, the term of this patent is extended or adjusted under 35 U.S.C. 154(b) by 246 days.

(21) Appl. No.: 16/554,738

(22) Filed: Aug. 29, 2019

(65) Prior Publication Data

US 2020/0077790 A1 Mar. 12, 2020

Related U.S. Application Data

(60) Provisional application No. 62/728,426, filed on Sep. 7, 2018.

(51) Int. Cl.

| | |
|---|---|
| *B65D 6/18* | (2006.01) |
| *C04B 18/26* | (2006.01) |
| *C04B 28/02* | (2006.01) |
| *D21C 9/12* | (2006.01) |
| *D21C 9/04* | (2006.01) |
| *D21C 9/10* | (2006.01) |
| *A47B 43/00* | (2006.01) |
| *C04B 24/38* | (2006.01) |
| *C04B 28/04* | (2006.01) |
| *D21C 9/16* | (2006.01) |
| *C04B 103/32* | (2006.01) |
| *C04B 103/30* | (2006.01) |

(52) U.S. Cl.
CPC ............ *C04B 18/265* (2013.01); *A47B 43/00* (2013.01); *C04B 24/383* (2013.01); *C04B 28/02* (2013.01); *C04B 28/04* (2013.01); *D21C 9/04* (2013.01); *D21C 9/10* (2013.01); *D21C 9/1063* (2013.01); *D21C 9/12* (2013.01); *D21C 9/163* (2013.01); *B65D 11/1853* (2013.01); *C04B 2103/304* (2013.01); *C04B 2103/32* (2013.01)

(58) Field of Classification Search
CPC ... A47B 43/00; A47B 47/042; B65D 11/1853; B65D 11/18; B65D 11/1813; B65D 11/1826; B65D 21/086; B65D 11/1846
USPC .............................................. 220/4.26, 4.28
See application file for complete search history.

(56) References Cited

U.S. PATENT DOCUMENTS

| | | | | |
|---|---|---|---|---|
| 4,273,284 A | * | 6/1981 | Hannigan | ............... E01B 11/54 238/152 |
| 6,955,365 B2 | | 10/2005 | Giampavolo et al. | |
| 7,761,963 B2 | * | 7/2010 | Koch | ................. B65D 11/1873 27/2 |
| 9,198,508 B1 | * | 12/2015 | Kufel | ................. A47B 47/0075 |
| 9,326,604 B1 | * | 5/2016 | Schuldt | ............... A47B 57/581 |
| 9,943,166 B1 | * | 4/2018 | Cleary | ................. A47B 43/00 |

(Continued)

*Primary Examiner* — Stephen J Castellano

(74) *Attorney, Agent, or Firm* — Brooks, Cameron & Huebsch, PLLC

(57) ABSTRACT

Devices and systems for collapsible engagement mechanisms are described herein. In some examples, one or more embodiments include a front panel, a first side panel connected to the front panel, a second side panel connected to the front panel, and a collapsible portion connected to at least one of the first side panel and the second side panel, where the collapsible portion is collapsible about a hinge.

16 Claims, 6 Drawing Sheets

(56) References Cited

U.S. PATENT DOCUMENTS

| | | | |
|---|---|---|---|
| 2010/0122964 A1* | 5/2010 | Lin .................... | A47B 43/00 |
| | | | 211/149 |
| 2015/0182021 A1* | 7/2015 | Chang ................ | A47B 81/06 |
| | | | 312/7.2 |
| 2019/0256253 A1* | 8/2019 | Van Bree ........... | B65D 25/04 |

* cited by examiner

COLLAPSIBLE ENGAGEMENT MECHANISM

PRIORITY INFORMATION

This application claims the benefit of Provisional Application Ser. No. 62/728,426, filed Sep. 7, 2018, the contents of which are incorporated herein by reference.

TECHNICAL FIELD

The present disclosure relates to collapsible engagement mechanisms.

BACKGROUND

A collapsible engagement mechanism can be engaged with an engagement structure. The collapsible engagement mechanism can be utilized in various ways. For example, a collapsible engagement mechanism can be used to store items, hang items, obstruct a view (e.g., for privacy), and/or be utilized as furniture (e.g., as a table, as a footrest, etc.), among other uses.

DETAILED DESCRIPTION

Figure 1:
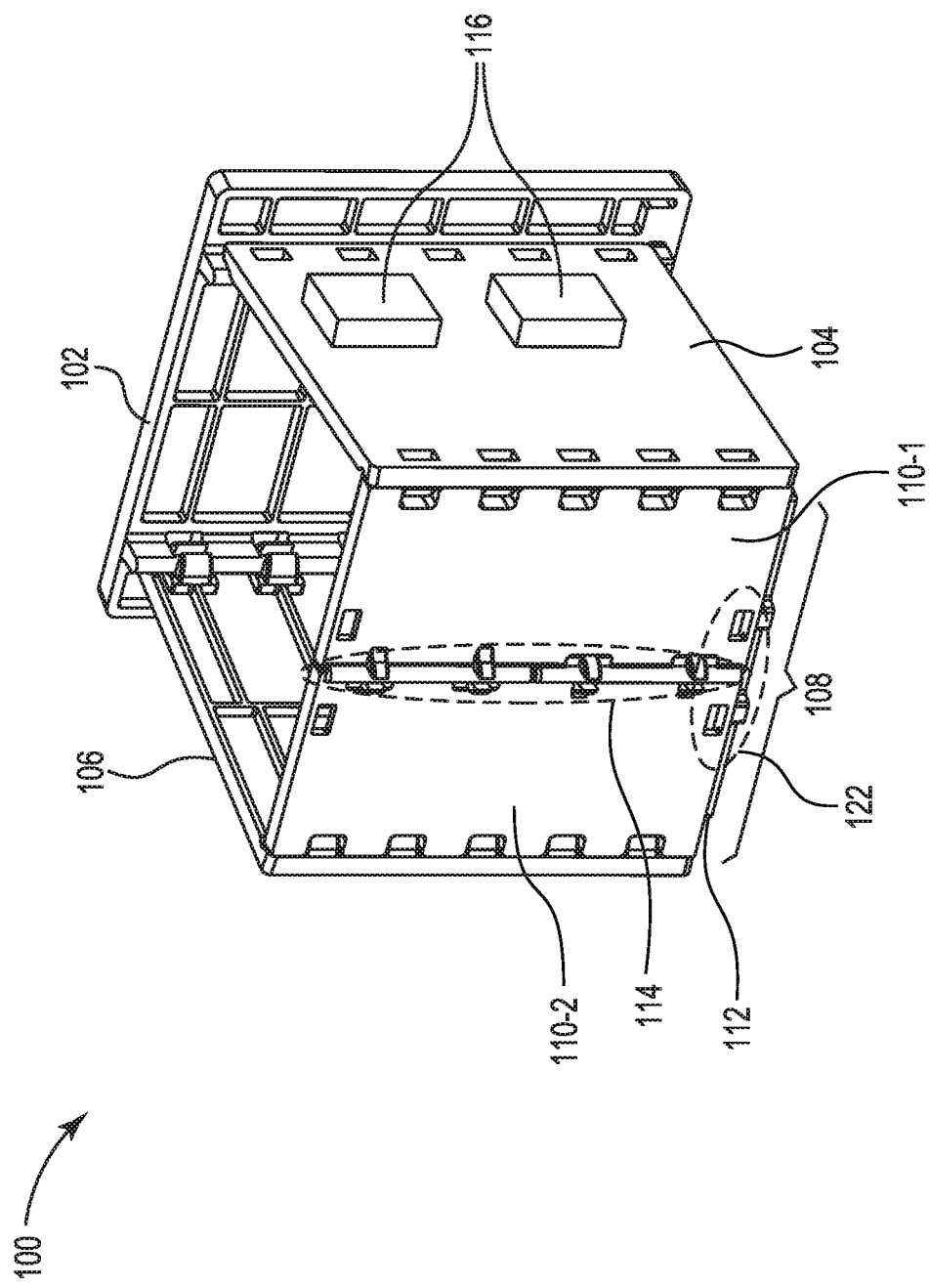
FIG. 1 is an example of a perspective view of a collapsible engagement mechanism, in accordance with one or more embodiments of the present disclosure.

Devices and systems for collapsible engagement mechanisms are described herein. In some examples, one or more embodiments include a front panel, a first side panel connected to the front panel, a second side panel connected to the front panel, and a collapsible portion connected to at least one of the first side panel and the second side panel, where the collapsible portion is collapsible about a hinge.

The collapsible portion of the engagement mechanism can allow for the engagement mechanism to be inserted into an engagement structure. The collapsible portion can then be engaged to secure the collapsible portion to the engagement structure. Securing the collapsible portion to the engagement structure can prevent movement of the collapsible engagement mechanism to allow for the collapsible engagement mechanism to be utilized in various ways.

Collapsible engagement mechanisms, in accordance with the present disclosure, can provide various benefits. For example, the collapsible engagement mechanism can be secured to an engagement structure without the use of additional hardware. Additionally, the collapsible engagement mechanism can be collapsed for efficient packaging and/or shipping. Further, the collapsible engagement mechanism can be pre-assembled such that a user can utilize the collapsible engagement mechanism without assembly.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, the term "a" refers to one element or more than one element. For example, a widget can refer to one widget, or can refer to more than one widget (e.g., two or more widgets).

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

FIG. 1 is an example of a side view of a collapsible engagement mechanism 100, in accordance with one or more embodiments of the present disclosure. As illustrated in FIG. 1, the collapsible engagement mechanism 100 can include front panel 102, first side panel 104, second side panel 106, and collapsible portion 108.

As illustrated in FIG. 1, collapsible engagement mechanism 100 can include front panel 102. As used herein, the term "panel" refers to a section of a structure. For example, front panel 102 can be a particular section of collapsible engagement mechanism 100. As illustrated in FIG. 1, front panel 102 is substantially straight. However, embodiments of the present disclosure are not so limited. For example, front panel 102 could be curved or be any other shape. Additionally, front panel 102 is illustrated in FIG. 1 as being solid. However, embodiments of the present disclosure are not so limited. For example, front panel 102 can be perforated (e.g., front panel 102 can include a series of holes through the thickness of the front panel 102) which may be utilized for weight reduction, stylistic purposes, and/or functional purposes, etc.

Collapsible engagement mechanism 100 can include first side panel 104. First side panel 104 can be connected to front panel 102. In some examples, first side panel 104 can be connected to front panel 102 via a hinge (e.g., first hinge 528, as is further described in connection with FIG. 5). As used herein, the term "hinge" refers to a device which attaches two objects to allow the objects to rotate relative to each other. For example, the hinge connecting first side panel 104 to front panel 102 can allow first side panel 104 to rotate relative to front panel 102 as is further described herein.

First side panel 104 can include engagement mechanisms 116. As used herein, the term "engagement mechanism" refers to a mechanism that engages an engagement structure when collapsible engagement mechanism 100 is in the engaged position such that collapsible engagement mechanism 100 is unable to move relative to the engagement structure. For example, engagement mechanisms 116 can engage an engagement structure when collapsible engagement mechanism 100 is in the engaged position for use as a planter, flag holder, bird feeder, cup holder, ash tray, organization system (e.g., garage, desk, office, etc.), seasonal decorations, among other examples, as is further described in connection with FIG. 6.

As illustrated in FIG. 1, first side panel 104 is substantially straight. However, embodiments of the present disclosure are not so limited. For example, first side panel 104 could be curved or be any other shape. Additionally, first side panel 104 is illustrated in FIG. 1 as being solid. However, embodiments of the present disclosure are not so limited. For example, first side panel 104 can be perforated (e.g., first side panel 104 can include a series of holes through the thickness of the first side panel 104) which may be utilized for weight reduction, stylistic purposes, and/or functional purposes, etc.

Collapsible engagement mechanism 100 can include second side panel 106. Second side panel 106 can be connected to front panel 102. Second side panel 106 can be connected to front panel 102 via a hinge (e.g., second hinge 530, as is further described in connection with FIG. 5). For example, the hinge connecting second side panel 106 to front panel 102 can allow second side panel 106 to rotate relative to front panel 102 as is further described herein.

Although not illustrated in FIG. 1, second side panel 106 can include engagement mechanisms (e.g., engagement mechanisms 218). The engagement mechanisms included on second side panel 106 can engage an engagement structure when collapsible engagement mechanism 100 is in the engaged position for use as a planter, flag holder, bird feeder, cup holder, ash tray, organization system (e.g., garage, desk, office, etc.), seasonal decorations, among other examples, as is further described in connection with FIG. 6.

As illustrated in FIG. 1, second side panel 106 is substantially straight. However, embodiments of the present disclosure are not so limited. For example, second side panel 106 could be curved or be any other shape. Additionally, second side panel 106 is illustrated in FIG. 1 as being solid. However, embodiments of the present disclosure are not so limited. For example, second side panel 106 can be perforated (e.g., second side panel 106 can include a series of holes through the thickness of the second side panel 106) which may be utilized for weight reduction, stylistic purposes, and/or functional purposes, etc.

As illustrated in FIG. 1, collapsible engagement mechanism 100 includes base panel 112. Base panel 112 can be connected to the front panel 102. Base panel 112 can be utilized to provide a platform to allow collapsible engagement mechanism 100 to function in different ways. For example, base panel 112 can be utilized as a support so that engagement mechanism 100 can receive materials, items, etc. For instance, engagement mechanism 100 can be a planter, and base panel 112 can be utilized as a platform so that soil and/or plant materials can be included in engagement mechanism 100. For example, petunias, garlic grass, dill, little pine trees, spices, vines, grass, and/or flowers may be planted in soil included in engagement mechanism 100 and supported by base panel 112. However, embodiments of the present disclosure are not so limited. For example, collapsible engagement mechanism 100 having base panel 112 can be utilized in other ways, such as a flag holder, a bird feeder (e.g., having bird seed), a cup holder, an ash tray, garage organization system, desk organization, seasonal decorations (e.g., Christmas stocking hangers), etc.

Although not illustrated in FIG. 1 for clarity and so as not to obscure embodiments of the present disclosure, in some embodiments, collapsible engagement mechanism 100 may not include base panel 112. For example, front panel 102, first side panel 104, and second side panel 106 may form an enclosed structure without a base panel 112. In such an example, collapsible engagement mechanism 100 may be utilized to store items such as lawn tools, grill tool rack, a flag holder, garage organization system, desk organization, seasonal decorations (e.g., Christmas stocking hangers), etc.

Although not illustrated in FIG. 1, in some examples, front panel 102 can include a hook. The hook of front panel 102 may be utilized to store/hang items, among other functions, and can be located on an inside portion of the front panel 102 (e.g., facing towards collapsible portion 108 and/or can be located on an outside portion of the front panel 102 (e.g., facing away from collapsible portion 108).

Collapsible engagement mechanism 100 can include collapsible portion 108. As used herein, the term "collapsible" refers to being able to be folded up or folded together. Collapsible portion 108 can comprise first collapsible panel 110-1 and second collapsible panel 110-2, which can be connected to first side panel 104 and second side panel 106 (e.g., via hinges). Collapsible portion 108 can be collapsible about a hinge 114. For example, collapsible portion 108 can be folded together via hinge 114 connecting a first collapsible panel 110-1 and a second collapsible panel 110-2 that comprise the collapsible portion 108, as is further described herein.

As illustrated in FIG. 1, collapsible portion 108 can include a first collapsible panel 110-1 and a second collapsible panel 110-2. The first collapsible panel 110-1 can be connected to the second collapsible panel 110-2 via hinge 114. First collapsible panel 110-1 and second collapsible panel 110-2 (e.g., collapsible portion 108) can be collapsible about hinge 114 such that the first collapsible panel 110-1 and the second collapsible panel 110-2 are able to be folded together about hinge 114, as is further described in connection with FIGS. 4 and 5.

Hinge 114 can be a snap hinge. As used herein, the term "snap hinge" refers to a device having a shaft connected to a first object and a hook connected to a second object, where the hook snaps to the shaft such that the hook rotates about the shaft to allow the first and second objects to rotate relative to each other. For example, first collapsible panel 110-1 can include a hook that snaps to a shaft of second collapsible panel 110-2 to allow the first collapsible panel 110-1 and the second collapsible panel 110-2 to rotate relative to each other (e.g., to collapse towards each other) from an over-center orientation of the first collapsible panel 110-1 and second collapsible panel 110-2 (e.g., as illustrated in FIG. 1) to a collapsed orientation (e.g., as illustrated and further described in connection with FIGS. 4 and 5).

Although hinge 114 is described above as a snap hinge, embodiments of the present disclosure are not so limited. For example, hinge 114 can be a barrel hinge, Mortise butt hinge, case hinge, continuous hinge, concealed hinge, butterfly hinge, strap hinge, H hinge, and/or HL hinge, among other types of hinges.

Although not illustrated in FIG. 1, collapsible portion 108 can be connected to first side panel 104 via a hinge (e.g., hinge 532, as is further described in connection with FIG. 5). Additionally, although not illustrated in FIG. 1, collapsible portion 108 can be connected to second side panel 106 via a hinge (e.g., hinge 534, as is further described in connection with FIG. 5).

Front panel 102, first side panel 104, second side panel 106, and/or collapsible portion 108 can be a polymer material. For instance, in some examples, front panel 102, first side panel 104, second side panel 106, and/or collapsible portion 108 (e.g., comprising first collapsible panel 110-1 and second collapsible panel 110-2) may be formed of a thermoplastic polymer resin. Examples of suitable thermoplastic polymer resins may include ultra-low density polyethylene, very low density polyethylene ("VLDPE"), linear low density polyethylene ("LLDPE"), low density polyethylene ("LDPE"), medium density polyethylene ("MDPE"), high density polyethylene ("HDPE"), polypropylene, isotactic polypropylene, highly isotactic polypropylene, syndiotactic polypropylene, random copolymer of propylene and ethylene and/or butene and/or hexene, elastomers such as ethylene propylene rubber, ethylene propylene diene monomer rubber, neoprene, and blends of thermoplastic polymers and elastomers, such as for example, thermoplastic elastomers and rubber toughened plastics. In some examples, the front panel 102, first side panel 104, second side panel 106, and/or collapsible portion 108 (e.g., comprising first collapsible panel 110-1 and second collapsible panel 110-2) may be formed of polyethylene terephthalate (PET). However, examples of the disclosure are not limited to the above described materials. For example, front panel 102, first side panel 104, second side panel 106, and/or collapsible portion 108 (e.g., comprising first collapsible panel 110-1 and second collapsible panel 110-2) may be formed of any other rigid material (e.g., metal, plastic, wood, bioplastics, etc.) The material may be biodegradable. Front panel 102, first side panel 104, second side panel 106, and/or collapsible portion 108 can be injection molded, 3D printed, and/or created using other manufacturing techniques.

Figure 4:
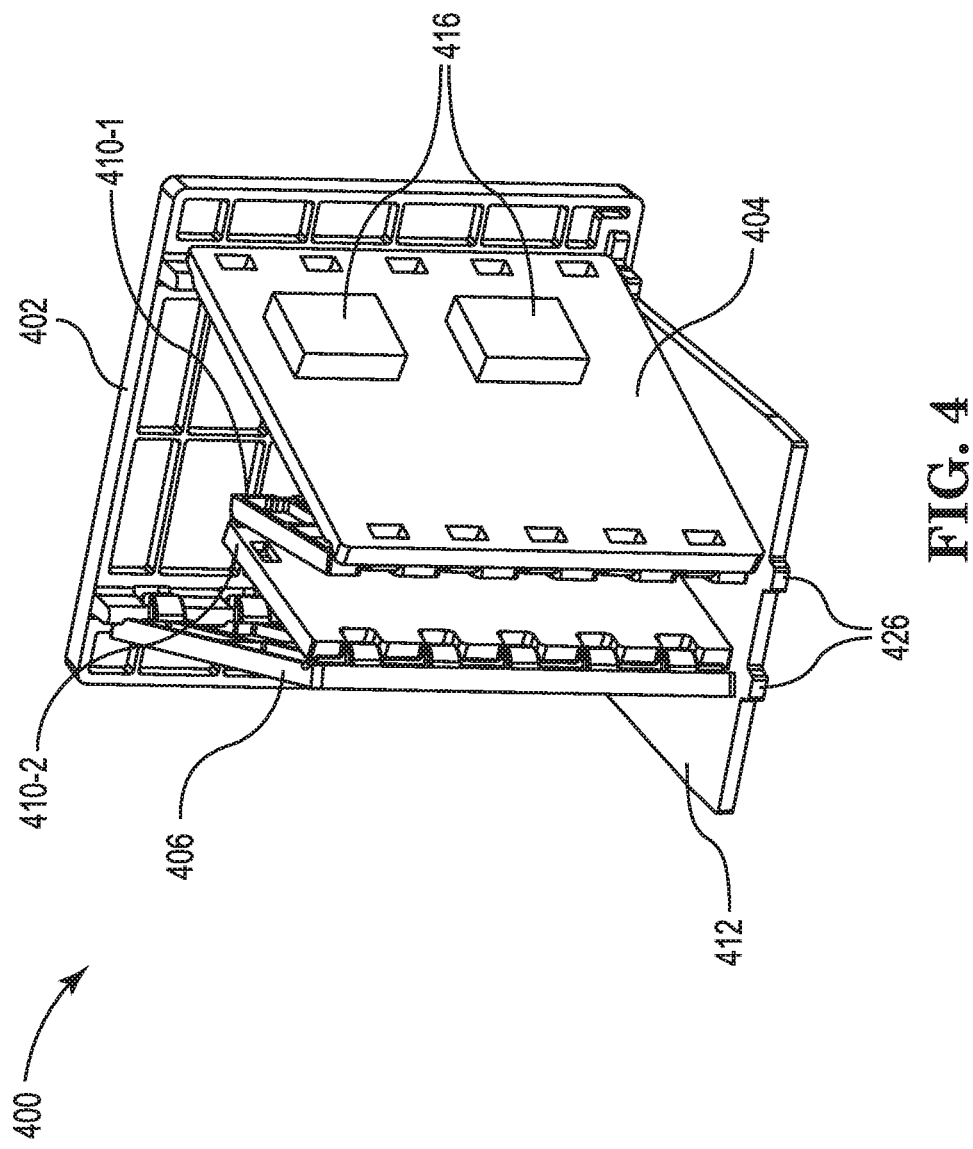
FIG. 4 is an example of a perspective view of a collapsible engagement mechanism in a collapsed position, in accordance with one or more embodiments of the present disclosure.

Collapsible portion 108 can be in an over-center orientation to prevent collapsible portion 108 from collapsing. As used herein, the term "over-center orientation" refers to an orientation of objects which creates tension between the objects which prevents the objects from moving relative to each other. For instance, as previously described above, collapsible portion 108 can include the first collapsible panel 110-1 and the second collapsible panel 110-2. In the orientation illustrated in FIG. 1, the first collapsible panel 110-1, the second collapsible panel 110-2, the first side panel 104, and the second side panel 106 are oriented such that a tension between the first collapsible panel 110-1 and the second collapsible panel 110-2 prevents the collapsible portion 108 from collapsing from the over-center orientation (e.g., as illustrated in FIG. 1) to a collapsed orientation (e.g., as illustrated in FIGS. 4 and 5). Collapsible portion 108 can be collapsible such that collapsible engagement mechanism 100 may be easier stored, transported, packaged, inserted into an engagement structure, etc., as is further described in connection with FIGS. 4 and 5.

In some examples, collapsible engagement mechanism 100 can include a locking mechanism 122. As used herein, the term "locking mechanism" refers to a device to secure an object or objects from movement. For example, locking mechanism 122 can lock first collapsible panel 110-1 and second collapsible panel 110-2 when the collapsible portion 108 is in the over-center orientation to prevent first collapsible panel 110-1 and second collapsible panel 110-2 from moving to the collapsed orientation, as is further described in connection with FIG. 3.

Figure 2:
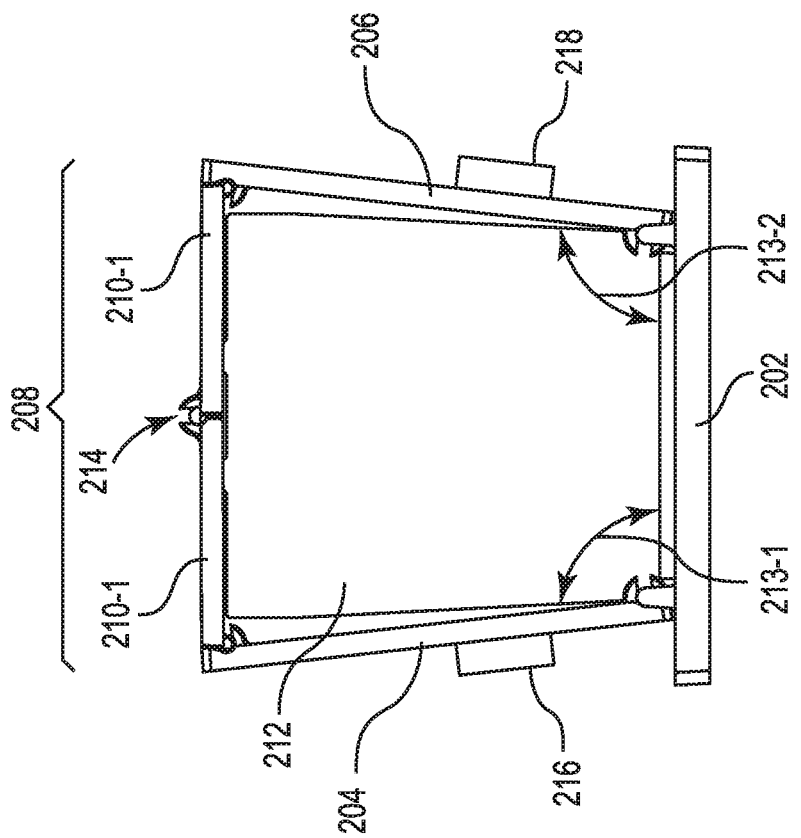
FIG. 2 is an example of a top view of a collapsible engagement mechanism in an engaged position, in accordance with one or more embodiments of the present disclosure.

FIG. 2 is an example of a top view of a collapsible engagement mechanism 200 in an engaged position, in accordance with one or more embodiments of the present disclosure. As illustrated in FIG. 2, collapsible engagement mechanism 200 can include front panel 202, first side panel 204, second side panel 206, base panel 212, first collapsible panel 210-1, and second collapsible panel 210-2. First side panel 204 can include first engagement mechanism 216. Second side panel 206 can include second engagement mechanism 218.

As illustrated in FIG. 2 and previously described in connection with FIG. 1, collapsible portion 208 can include first collapsible panel 210-1 and second collapsible panel 210-2. First collapsible panel 210-1 can be connected to first side panel 204 by a hinge (e.g., hinge 532, as is further described in connection with FIG. 5) such that first collapsible panel 210-1 can rotate relative to first side panel 204. Second collapsible panel 210-2 can be connected to second side panel 206 by a hinge (e.g., hinge 534, as is further described in connection with FIG. 5) such that second collapsible panel 210-2 can rotate relative to second side panel 206.

First collapsible panel 210-1 and second collapsible panel 210-2 can be connected to each other by hinge 214. First collapsible panel 210-1 and second collapsible panel 210-2 can be collapsible about hinge 214. For example, hinge 214 can allow first collapsible panel 210-1 and second collapsible panel 210-2 to rotate relative to each other to allow first collapsible panel 210-1 and second collapsible panel 210-2 to fold in towards each other when moving from the over-center orientation (e.g., as illustrated in FIG. 2) to a collapsed orientation (e.g., as is further described in connection with FIGS. 4 and 5).

As previously described in connection with FIG. 1 and as illustrated in FIG. 2, collapsible portion 208 can be in an over-center orientation to prevent collapsible portion 208 from collapsing. For example, first collapsible panel 210-1, second collapsible panel 210-2, first side panel 204, and second side panel 206 can be oriented such that a tension between the first collapsible panel 210-1 and the second collapsible panel 210-2 prevents the collapsible portion 208 from collapsing from the over-center orientation (e.g., as illustrated in FIG. 2) to a collapsed orientation (e.g., as illustrated in FIGS. 4 and 5).

In order to achieve an over-center orientation, first collapsible panel 210-1 and second collapsible panel 210-2 can include dimensions and be oriented to cause an angle 213-1 between an inner side (e.g., facing towards the second side panel 206) of first side panel 204 and an inner side (e.g., facing towards the first collapsible panel 210-1 and second collapsible panel 210-2) of front panel 202 to be greater than 90°. Similarly, in the over-center orientation as illustrated in FIG. 2, the first collapsible panel 210-1 and the second collapsible panel 210-2 can cause an angle 213-2 between an inner side (e.g., facing towards the first side panel 204) of second side panel 206 and an inner side (e.g., facing towards the first collapsible panel 210-1 and second collapsible panel 210-2) of front panel 202 to be greater than 90°. Such an orientation of first collapsible panel 210-1 and second collapsible panel 210-2 to cause angles 213-1 and 213-2 to be greater than 90° can cause natural tension between first collapsible panel 210-1, second collapsible panel 210-2, first side panel 204, and second side panel 206 such that collapsible portion 208 is prevented from collapsing from the over-center orientation to a collapsed orientation.

In the over-center orientation illustrated in FIG. 2, angles 213-1 and 213-2 can be greater than 90°. For example, angles 213-1 and 213-2 can be 105°. However, embodiments of the present disclosure are not so limited to angles 213-1 and 213-2 being 105°. For example, angles 213-1 and 213-2 can be less than 105° (but greater than 90°) or greater than 105°. Additionally, although angles 213-1 and 213-2 are described above as both being 105°, embodiments of the present disclosure are not so limited. For example, angle 213-1 between first side panel 204 and front panel 202 (e.g., 103°) can be different than the angle 213-2 between second side panel 206 and front panel 202 (e.g., 105°) when collapsible portion 208 is in the over-center orientation.

Although not illustrated in FIG. 2 for clarity and so as not to obscure embodiments of the present disclosure, angles 213-1 and 213-2 can be less than 90° when collapsible engagement mechanism 200 is in the engaged position. In such an example, the engagement mechanisms 216, 218 can be a certain thickness to engage an engagement mechanism at a point where angles 213-1 and 213-2 are less than 90° when collapsible portion 208 is in the engaged position. Further, a locking mechanism can be included to prevent the collapsible engagement mechanism 200 from moving to a collapsed position, as first collapsible panel 210-1 and second collapsible panel 210-2 would not be in an over-center orientation to prevent such a collapse in such an example where angles 213-1 and 213-2 are less than 90° when collapsible engagement mechanism 200 is in the engaged position.

As previously described above, first side panel 204 can include first engagement mechanism 216. Similarly, second side panel 206 can include second engagement mechanism 218. Engagement mechanisms 216, 218 can be a compressible material. For example, engagement mechanisms 216, 218 can be a foam material. The foam material can be, for instance, polyurethanes and/or high density polyurethanes such as those used in making elastomeric or semi-elastomeric polyurethane products, including noncellular or microcellular elastomers, coatings, adhesives, sealants, and flexible, rigid, and/or viscoelastic polyurethane foams, among other examples of foam materials. However, embodiments of the present disclosure are not so limited to polyurethane materials. For example, engagement mechanisms 216, 218 can be Polyethylene terephthalate (PET), polyethylene naphthalate (PEN), polyimide (PI), synthetic paper, polycarbonate, polyacrylics (PMMA), polyurethane, rubber, polyolefin and/or elastic polymers, or the like.

The engagement mechanisms 216, 218 can be a compressible material in order to engage an engagement structure to provide a friction and/or interference fit with the engagement structure such that the collapsible engagement mechanism 200 is unable to move relative to the engagement structure when collapsible engagement mechanism 200 is in an engaged position, as is further described in connection with FIG. 6. Engagement mechanisms 216, 218 can extend from a surface of the first side panel 204 and second side panel 206 (e.g., have a thickness), respectively, a distance of 0.5 inches, 1 inch, and/or any other distance. Different thicknesses may be utilized to compensate for differently sized engagement structures. For example, the engagement structures to which engagement mechanisms 216, 218 can contact (e.g., such that collapsible engagement mechanism 200 can be in in the engaged position) may be differently sized and/or spaced apart, and the collapsible engagement mechanism 200 can utilize engagement mechanisms 216, 218 with different/various thicknesses based on the size and/or spacing of the engagement structures, as is further described in connection with FIG. 6.

Although not illustrated in FIG. 2 (but previously illustrated in FIG. 1), collapsible engagement mechanism 200 can include two first engagement mechanisms 216 connected to first side panel 204. Further, although not illustrated in FIG. 2, collapsible engagement mechanism 200 can include two second engagement mechanisms 218 connected to second side panel 206. However, embodiments of the present disclosure are not so limited. For example, collapsible engagement mechanism 200 can include one first engagement mechanism 216 and one second engagement mechanism 218. In some examples, collapsible engagement mechanism 200 can include one first engagement mechanism 216 and more than one second engagement mechanism 218. In some examples, collapsible engagement mechanism 200 can include more than one first engagement mechanism 216 and one second engagement mechanism 218. In some examples, collapsible engagement mechanism 200 can include more than two first engagement mechanisms 216 and more than two second engagement mechanisms 218.

As illustrated in FIG. 2, the cross-sections of engagement mechanisms 216, 218 are rectangularly shaped (e.g., engagement mechanisms 216, 218 are rectangular prisms). However, embodiments of the present disclosure are not so limited. For example, the cross-sections of engagement mechanisms 216, 218 can be square shaped (e.g., engagement mechanisms 216, 218 are cubes), triangularly shaped (e.g., engagement mechanisms 216, 218 are triangular prisms), circularly shaped (e.g., engagement mechanisms 216, 218 are cylindrical prisms), among other cross-sectional shapes. Further, first engagement mechanisms 216 and second engagement mechanisms 218 can be differently shaped (e.g., first engagement mechanisms 216 can be rectangular prisms while second engagement mechanisms 218 can be triangular prisms, among other examples).

Figure 3:
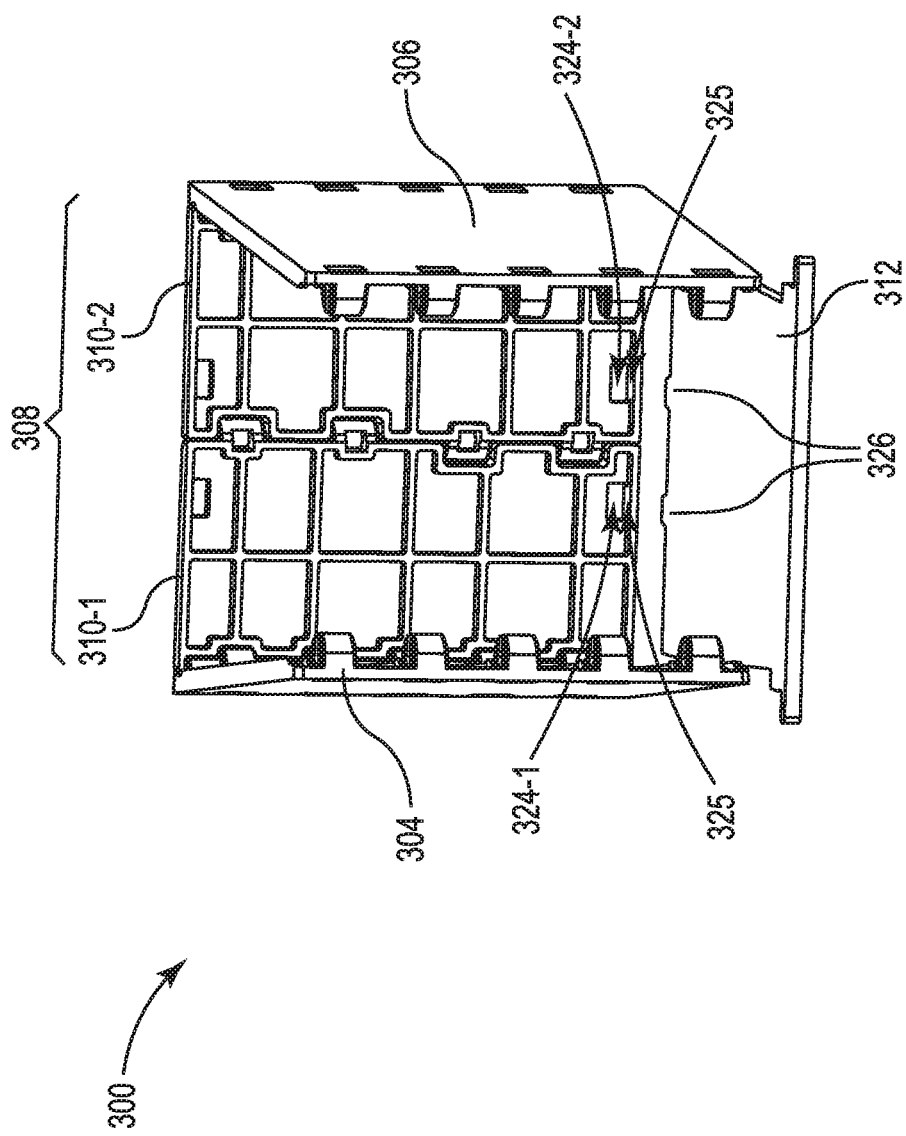
FIG. 3 is an example of a perspective section view of a collapsible engagement mechanism in an engaged position, in accordance with one or more embodiments of the present disclosure.

FIG. 3 is an example of a perspective section view of a collapsible engagement mechanism 300 in an engaged position, in accordance with one or more embodiments of the present disclosure. As illustrated in the section view of FIG. 3, collapsible engagement mechanism 300 can include first side panel 304, second side panel 306, base panel 312, first collapsible panel 310-1, and second collapsible panel 310-2.

As previously described in connection with FIG. 1, collapsible engagement mechanism 300 can include a locking mechanism. The locking mechanism can lock first collapsible panel 310-1 and second collapsible panel 310-2 when the collapsible engagement mechanism 300 is in the engaged position to prevent first collapsible panel 310-1 and second collapsible panel 310-2 from moving to the collapsed orientation.

As illustrated in FIG. 3, the base panel 312 can include tabs 326. As used herein, the term "tab" refers to a projection of material. For example, tabs 326 can be projections of material from base panel 312.

As illustrated in FIG. 3, the collapsible portion 308 can include slots 324-1 and 324-2. As used herein, the term "slot" refers to an elongated groove or aperture to receive an object. For example, as illustrated in FIG. 3, slots 324-1 and 324-2 can be apertures through a thickness of first collapsible panel 310-1 and second collapsible panel 310-2. However, embodiments of the present disclosure are not so limited. For example, slots 324-1 and 324-2 can be grooves in first collapsible panel 310-1 and 310-2 that do not exceed (e.g., does not extend all the way through) the thickness of first collapsible panel 310-1 and second collapsible panel 310-2. The slots 324-1 and 324-2 can receive tabs 326, as is further described herein.

The locking mechanism can be, in one example, tabs 326 being located in slots 324-1, 324-2 of first collapsible panel 310-1 and second collapsible panel 310-2, respectively. For example, the tabs 326 of the base panel 312 can be located in slots 324-1, 324-2 to lock the collapsible engagement mechanism 300 in the engaged position. In an instance in which slots 324-1 and 324-2 are apertures, the slots 324-1 and 324-2 can receive tabs 326 and tabs 326 may extend partially through or wholly through slots 324-1 and 324-2. Further, in an instance in which slots 324-1 and 324-2 are grooves, the slots 324-1 and 324-2 can receive tabs 326 and tabs 326 may extend partially into slots 324-1 and 324-2. A user can cause the tabs 326 to be received by slots 324-1 and 324-2 when the user moves the collapsible engagement mechanism 300 to an engaged position to lock first collapsible panel 310-1 and second collapsible panel 310-2 in an over-center orientation to prevent first collapsible panel 310-1 and second collapsible panel 310-2 from moving to the collapsed orientation.

As illustrated in FIG. 3, the collapsible portion 308 can include a ledge 325. As used herein, the term "ledge" refers to a shelf-like projection of material. For example, ledge 325 can be a shelf-like projection of material from first collapsible panel 310-1 and/or second collapsible panel 310-2.

The locking mechanism can be, in another example, tabs 326 included on base panel 312 being located adjacent to ledge 325. For example, the tabs 326 of the base panel 312 can be located adjacent to (e.g., on top of) ledge 325 to lock the collapsible engagement mechanism 300 in the engaged position. A user can cause the tabs 326 to be located on top of ledge 325 when the user moves the collapsible engagement mechanism 300 to an engaged position to lock first collapsible panel 310-1 and second collapsible panel 310-2 in the over-center orientation to prevent first collapsible panel 310-1 and second collapsible panel 310-2 in the over-center orientation to prevent collapsible portion 308 from moving to the collapsed orientation.

Although the locking mechanism is illustrated in FIG. 3 as being tabs located in slots or tabs located adjacent to (e.g., on top of) a ledge, embodiments of the present disclosure are not so limited. For example, although not illustrated in FIG. 3, the locking mechanism can be a hook and loop locking mechanism, a sliding bolt locking mechanism, a rotating shaft locking mechanism, a chain locking mechanism, among other types of locking mechanisms.

FIG. 4 is an example of a perspective view of a collapsible engagement mechanism 400 in a collapsed position, in accordance with one or more embodiments of the present disclosure. As illustrated in FIG. 4, collapsible engagement mechanism 400 can include front panel 402, first side panel 404, second side panel 406, base panel 412, first collapsible panel 410-1, and second collapsible panel 410-2. Base panel 412 can include tabs 426. First side panel 404 can include first engagement mechanism 416. Although not illustrated in FIG. 4, second side panel 406 can include a second engagement mechanism (e.g., second engagement mechanism 218, previously described in connection with FIG. 2).

As illustrated in FIG. 4 and previously described in connection with FIG. 1, first collapsible panel 410-1 can be connected to first side panel 404 by a hinge (e.g., hinge 532, as is further described in connection with FIG. 5). Further, second collapsible panel 410-2 can be connected to second side panel 406 by a hinge (e.g., hinge 534, as is further described in connection with FIG. 5). First collapsible panel 410-1 and second collapsible panel 410-2 can be connected to each other by a hinge (e.g., hinge 514, as is further described in connection with FIG. 5). First collapsible panel 410-1 and second collapsible panel 410-2 can be collapsible about the hinge as is further described herein.

As illustrated in FIG. 4, collapsible engagement mechanism 400 can be in the collapsed position. As used herein, the term "collapsed position" refers to an orientation of first side panel 404, second side panel 406, first collapsible panel 410-1, and second collapsible panel 410-2 such that collapsible engagement mechanism 400 is able to be inserted into an engagement structure. For example, first collapsible panel 410-1 and second collapsible panel 410-2 can be rotatable about the hinge connecting first collapsible panel 410-1 and second collapsible panel 410-2 to allow first collapsible panel 410-1 and second collapsible panel 410-2 to fold in towards each other when moving from the over-center orientation (e.g., as previously illustrated in FIGS. 1-3) to the collapsed orientation (e.g., as illustrated in FIG. 4). First side panel 404 and second side panel 406 can rotate relative to front panel 402 in response to first collapsible panel 410-1 and second collapsible panel 410-2 being collapsed. In the collapsed position, collapsible engagement mechanism 400 can be inserted into an engagement structure. First collapsible panel 410-1 and second collapsible panel 410-2 of collapsible engagement mechanism 400 can then be moved to the over-center orientation to secure the collapsible engagement mechanism 400 to the engagement structure, as is further described in connection with FIG. 6.

Figure 5:
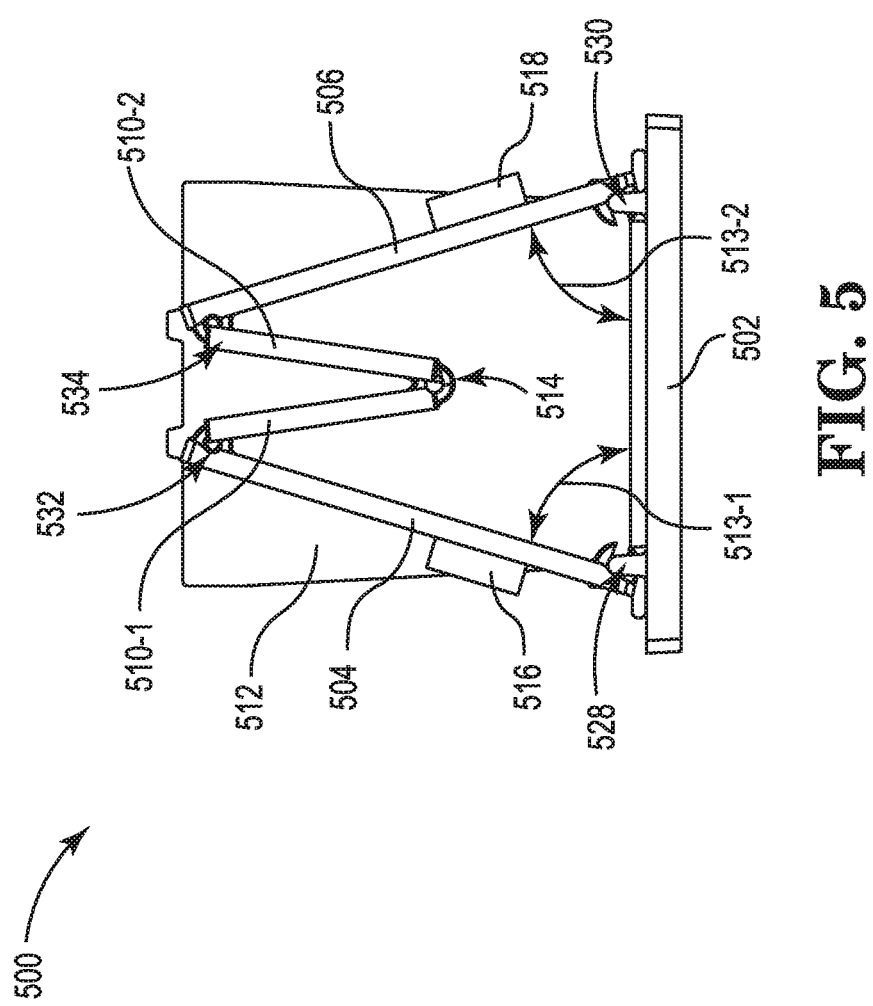
FIG. 5 is an example of a top view of a collapsible engagement mechanism in a collapsed position, in accordance with one or more embodiments of the present disclosure.

FIG. 5 is an example of a top view of a collapsible engagement mechanism 500 in a collapsed position, in accordance with one or more embodiments of the present disclosure. As illustrated in FIG. 5, collapsible engagement mechanism 500 can include front panel 502, first side panel 504, second side panel 506, base panel 512, first collapsible panel 510-1, and second collapsible panel 510-2. First side panel 504 can include first engagement mechanism 516. Second side panel 506 can include second engagement mechanism 518.

As described above, first side panel 504 can be connected to front panel 502 via first hinge 528. Second side panel 506 can be connected to front panel 502 via second hinge 530. First collapsible panel 510-1 can be connected to second collapsible panel 510-2 via third hinge 514. First collapsible panel 510-1 can be connected to first side panel 504 via fourth hinge 532. Second collapsible panel 510-2 can be connected to second side panel 506 via fifth hinge 534. First hinge 528 and second hinge 530 can allow first side panel 504 and second side panel 506 to rotate relative to front panel 502. For example, when collapsible portion 508 is being collapsed (e.g., from the over-center orientation as previously illustrated in FIGS. 1-3 to the collapsed orientation as illustrated in FIG. 5) or when collapsible portion 508 is being engaged (e.g., from the collapsed orientation as illustrated in FIG. 5 to the over-center orientation as previously illustrated in FIGS. 1-3), hinges 528 and 530 can allow first side panel 504 and second side panel 506 to rotate relative to front panel 502, hinges 514 and 532 can allow first collapsible panel 510-1 to rotate relative to first side panel 504 and second collapsible panel 510-2, and hinges 514 and 534 can allow second collapsible panel 510-2 to rotate relative to second side panel 506 and first collapsible panel 510-1.

In some examples, hinges 514, 528, 530, 532, 534 can be snap hinges. For example, first hinge 528 can be a snap hinge to allow first side panel 504 to rotate relative to front panel 502, second hinge 530 can be a snap hinge to allow second side panel 506 to rotate relative to front panel 502, third hinge 514 can be a snap hinge to allow first collapsible panel 510-1 to rotate relative to second collapsible panel 510-2, fourth hinge 532 can be a snap hinge to allow first collapsible panel 510-1 to rotate relative to first side panel 504, and fifth hinge 534 can be a snap hinge to allow second collapsible panel 510-2 to rotate relative to second side panel 506.

Although hinges 514, 528, 530, 532, 534 are described above as being snap hinges, embodiments of the present disclosure are not so limited. For example, hinges 514, 528, 530, 532, 534 can be a barrel hinge, Mortise butt hinge, case hinge, continuous hinge, concealed hinge, butterfly hinge, strap hinge, H hinge, and/or HL hinge, among other types of hinges. Further, different ones of the hinges 514, 528, 530, 532, 534 can be different types of hinges. For instance, hinges 528 and 530 can be snap hinges while hinges 514, 532, 534 can be barrel hinges, among other examples and/or combinations of hinge types.

In the collapsed position illustrated in FIG. 5, an angle 513-1 between an inner side of first side panel 504 and an inner side of front panel 502 can be less than 90° when first collapsible panel 510-1 and second collapsible panel 510-2 are in the collapsed orientation. Further, angle 513-2 between an inner side of second side panel 506 and an inner side of front panel 502 can be less than 90° when first collapsible panel 510-1 and second collapsible panel 510-2 are in the collapsed orientation. For example, angles 513-1 and 513-2 can be 70°. However, embodiments of the present disclosure are not so limited to angles 513-1 and 513-2 being 70°. For example, angles 513-1 and 513-2 can be less than 70° or greater than 70° (but less than 90°). Additionally, although angles 513-1 and 513-2 are described above as being 70° between first side panel 504 and front panel 502 as well as 70° between second side panel 506 and front panel 502, embodiments of the present disclosure are not so limited. For example, the angle 513-1 between first side panel 504 and front panel 502 can be different than the angle 513-2 between second side panel 506 and front panel 502 when first collapsible panel 510-1 and second collapsible panel 510-2 are in the collapsed orientation. From the collapsed position, the collapsible engagement mechanism 500 can be inserted into and engaged with an engagement structure, as is further described in connection with FIG. 6.

Figure 6:
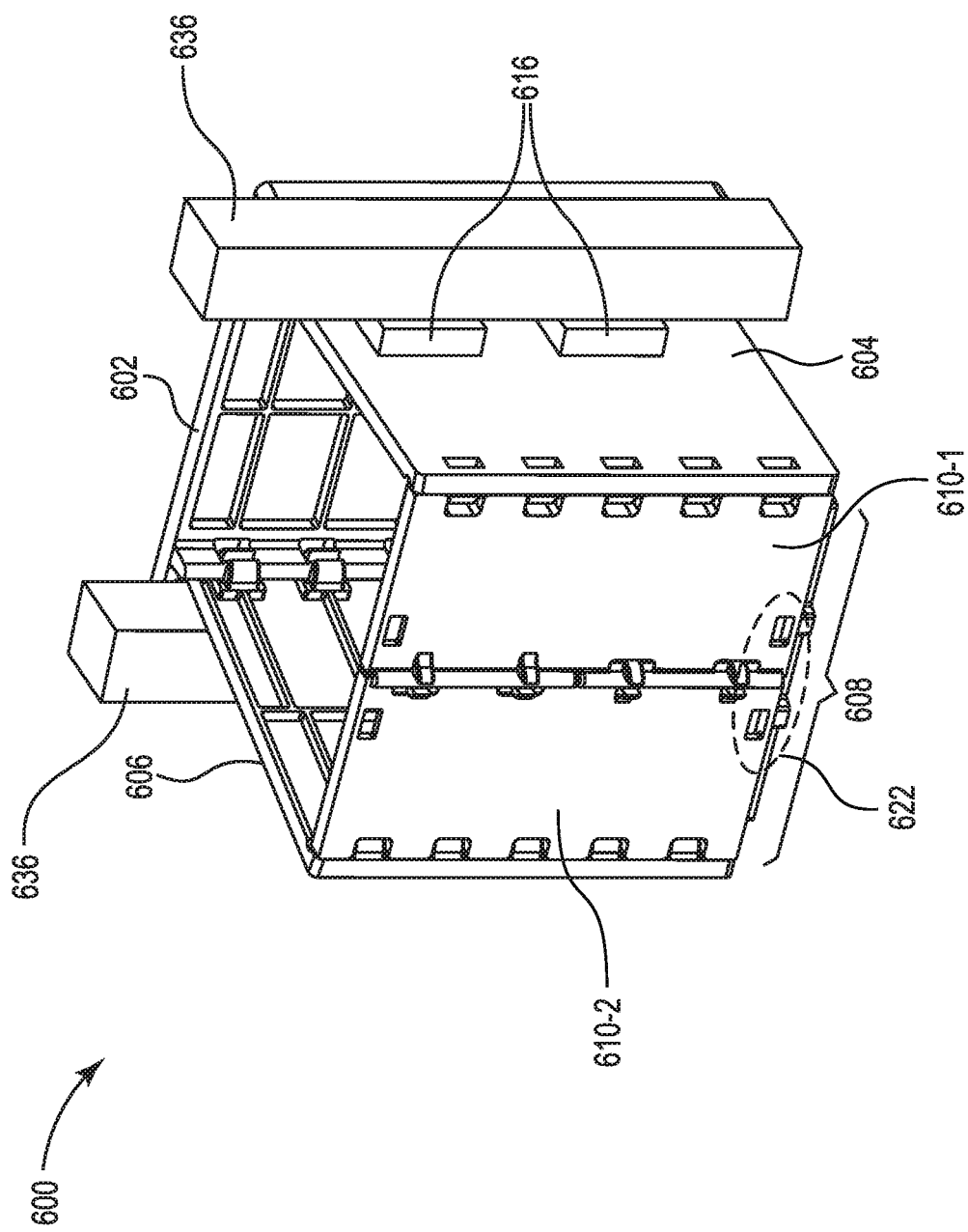
FIG. 6 is an example of a perspective view of a system including a collapsible engagement mechanism in an engaged position and an engagement structure, in accordance with one or more embodiments of the present disclosure.

FIG. 6 is an example of a perspective view of a system including a collapsible engagement mechanism 600 in an engaged position and an engagement structure 636, in accordance with one or more embodiments of the present disclosure. As illustrated in FIG. 6, collapsible engagement mechanism 600 can include front panel 602, first side panel 604, second side panel 606, first collapsible panel 610-1, second collapsible panel 610-2, and locking mechanism 622. First side panel 504 can include first engagement mechanism 616. Although not illustrated in FIG. 6, second side panel 606 can include a second engagement mechanism (e.g., second engagement mechanism 218, 518, previously described in connection with FIGS. 2 and 5, respectively).

As previously described in connection with FIGS. 4 and 5, the collapsible engagement mechanism 600 can be in a collapsed position when the first collapsible panel 510-1 and the second collapsible panel 510-2 are in a collapsed orientation. In the collapsed position, the collapsible engagement mechanism 600 can be inserted between an engagement structure 636. As used herein, the term "engagement structure" refers to a structure to which collapsible engagement mechanism 600 can engage to when first collapsible panel 610-1 and second collapsible panel 610-2 are in an over-center orientation such that collapsible engagement mechanism 600 is unable to move relative to the engagement structure 636, and can disengage from the engagement structure 636 when first collapsible panel 610-1 and second collapsible panel 610-2 are in the collapsed orientation.

As illustrated in FIG. 6, engagement structure 636 can be comprised of two rails. In some examples, the two rails can be baluster rails. The engagement structures 636 can be any distance apart and the collapsible engagement mechanism 600 can include dimensions to interact with the dimensions of the engagement structures 636. For example, the engagement structures 636 can be spaced 3.5 inches apart, 4 inches apart, and/or any other distance apart and can be any size. First collapsible panel 610-1 and second collapsible panel 610-2 can be in a collapsed orientation such that collapsible engagement mechanism 600 can be inserted into engagement structure 636 (e.g., collapsible engagement mechanism 600 can be inserted between the two rails).

As illustrated in FIG. 6, the collapsible engagement mechanism 600 can be in an engaged position. That is, first collapsible panel 610-1 and second collapsible panel 610-2 can be oriented in an over-center orientation such that a tension between the first collapsible panel 610-1 and the second collapsible panel 610-2 prevents the collapsible engagement structure 600 from collapsing from the engaged position (e.g., as illustrated in FIG. 6) to the collapsed position (e.g., as illustrated in FIGS. 4 and 5).

When first collapsible panel 610-1 and second collapsible panel 610-2 are moved to the over-center orientation, the first engagement structures 616 connected to first side panel 604 and second engagement structures (e.g., not illustrated in FIG. 6) connected to second side panel 606 can engage engagement structure 636. For example, first engagement mechanisms 616 and second engagement mechanisms can engage engagement structure 636 such that collapsible engagement mechanism 600 is unable to move relative to engagement structure 636 when collapsible engagement mechanism 600 is in the engaged position.

In order to engage the engagement structure 636, first engagement mechanisms 616 and the second engagement mechanisms (e.g., not illustrated in FIG. 6) can create compressive force(s) on engagement structure 636 when collapsible engagement mechanism 600 is in the engaged position (e.g., first collapsible panel 610-1 and second collapsible panel 610-2 are in the over-center orientation). For example, when first collapsible panel 610-1 and second collapsible panel 610-2 are moved from the collapsed orientation to the over-center orientation, an inner side at the edges of front panel 602 can press against a side of engagement structure 636 facing the front panel 602. Additionally, first engagement mechanisms 616 and the second engagement mechanisms can press against sides of engagement structure 636 facing first side panel 604 and second side panel 606, respectively. In some examples, the first engagement mechanisms 616 and the second engagement mechanisms can be compressed by engagement structure 636 due to first engagement mechanisms 616 and the second engagement mechanisms being of a compressible material. The pressing of first engagement mechanisms 616, the second engagement mechanisms, and an inner side at the edges of front panel 602 against engagement structure 636 can create the compressive force(s) on engagement structure 636. The compressive force(s) can provide a friction and/or interference fit between engagement structure 636 and collapsible engagement mechanism 600 such that collapsible engagement mechanism 600 is unable to move relative to the engagement structure 636 collapsible engagement mechanism 600 is in the engaged position. Additionally, the compressive force(s) can create pressure on the over-center orientation (e.g., as described in connection with FIG. 2) of the first collapsible panel 610-1 and second collapsible panel 610-2, which can prevent collapsible engagement mechanism 600 from moving from the engaged position to the disengaged position.

The dimensions of collapsible engagement mechanism 600 can be selected such that collapsible engagement mechanism 600 can be inserted into engagement structure 636 when first collapsible panel 610-1 and second collapsible panel 610-2 are in the collapsed orientation and first collapsible panel 610-1 and second collapsible panel 610-2 can be moved from the collapsed orientation to the over-center orientation to engage with engagement structure 636.

As illustrated in FIG. 6, collapsible engagement mechanism 600 can include a locking mechanism 622. Locking mechanism 622 can lock first collapsible panel 610-1 and second collapsible panel 610-2 in the over-center orientation to lock collapsible engagement mechanism 600 in the engaged position. For example, the locking mechanism can be tabs (e.g., tabs 326, 436, previously described in connection with FIGS. 3 and 4, respectively) that can be included on a base panel (e.g., not illustrated in FIG. 6) and received by a slot (e.g., slot 324-1, 324-2, previously described in connection with FIG. 3) included in first collapsible panel 610-1 and/or second collapsible panel 610-2. For example, as illustrated in FIG. 6, the tabs can be received by the slots included in first collapsible panel 610-1 and second collapsible panel 610-2 to lock first collapsible panel 610-1 and second collapsible panel 610-2 in the over-center orientation.

In the engaged position, collapsible engagement mechanism 600 can provide different functions. For example, collapsible engagement mechanism 600 can be secured between two baluster rails (e.g., engagement structures 636) on a porch, balcony, and/or other area for use as a planter (e.g., to receive flowers, grass, and/or other plant materials). In other examples, collapsible engagement mechanism 600 can be secured between engagement structures 636 for use as a privacy device (e.g., to block a view into an apartment/condominium/household porch/balcony/etc.), flag holder, bird feeder (e.g., to receive bird seed), grill tool rack, lawn tool rack, a cup holder, ash tray, organization system (e.g., garage organizer, desk organizer, office organizer, etc.), seasonal decorations, among other examples.

A collapsible engagement mechanism according to the disclosure can be in a collapsed position, inserted into an engagement structure, and secured to the engagement structure by moving the collapsible engagement mechanism to an engaged position without using additional fasteners and/or other hardware as compared to previous approaches. Further, a collapsible engagement mechanism may be in a collapsed position for efficient packaging and/or shipping, and can be pre-assembled for ease of use by a user.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A collapsible engagement mechanism, comprising:
   a front panel;
   a base panel connected to the front panel, the base panel including a tab;
   a first side panel connected to the front panel via a first hinge;
   a second side panel connected to the front panel via a second hinge; and
   a collapsible portion including a slot, the collapsible portion connected to at least one of the first side panel and the second side panel, wherein:
   the collapsible portion is collapsible about a third hinge such that the collapsible engagement mechanism is configured to be in a collapsed position;
   the first side panel, the second side panel, and the collapsible portion are configured to rotate relative to the front panel and the base panel such that the collapsible portion moves from the collapsed orientation to an over-center orientation and the collapsible engagement mechanism moves from the collapsed position to an engaged position; and
   the tab of the base panel is configured to be located in the slot to lock the collapsible portion in the engaged position.

2. The collapsible engagement mechanism of claim 1, wherein the collapsible portion is configured to be in the over-center orientation such that the collapsible engagement mechanism is in the engaged position to prevent the collapsible portion from collapsing.

3. The collapsible engagement mechanism of claim 1, wherein the first side panel and the second side panel are configured to rotate relative to the front panel in response to the collapsible portion being collapsed to the collapsed orientation.

4. The collapsible engagement mechanism of claim 1, wherein the collapsible portion includes:
   a first collapsible panel connected to the first side panel; and
   a second collapsible panel connected to the second side panel;
   wherein the first and second collapsible panels are connected to each other via the third hinge and are collapsible about the hinge.

5. The collapsible engagement mechanism of claim 1, wherein the first side panel includes a first engagement mechanism.

6. The collapsible engagement mechanism of claim 1, wherein the second side panel includes a second engagement mechanism.

7. A system, comprising:
a collapsible engagement mechanism comprising:
   a front panel;
   a first side panel connected to the front panel via a first hinge and including a first engagement mechanism, wherein the first side panel rotates about the first hinge when the collapsible engagement mechanism is moved from an engaged position to a collapsed position;
   a second side panel connected to the front panel via a second hinge and including a second engagement mechanism, wherein the second side panel rotates about the second hinge when the collapsible engagement mechanism is moved from the engaged position to the collapsed position;
   a base panel connected to the front panel, the base panel including a tab; and
   a collapsible portion including a slot, the collapsible portion connected to at least one of the first side panel and the second side panel, wherein:
      the collapsible portion is collapsible about a third hinge such that the collapsible engagement mechanism is configured to be in the collapsed position;
      the first side panel, the second side panel, and the collapsible portion are configured to rotate relative to the front panel and the base panel such that the collapsible portion moves from the collapsed orientation to an over-center orientation and the collapsible engagement mechanism moves from the collapsed position to the engaged position; and
      the tab of the base panel is configured to be located in the slot to lock the collapsible portion in the engaged position.

8. The system of claim 7, wherein the system further includes an engagement structure.

9. The system of claim 8, wherein the collapsible engagement mechanism is configured to be inserted into the engagement structure when the collapsible portion is in the collapsed orientation.

10. The system of claim 8, wherein the first engagement mechanism and the second engagement mechanism are configured to engage the engagement structure when the collapsible portion is in the over-center orientation such that the collapsible engagement mechanism is unable to move relative to the engagement structure when the collapsible engagement mechanism is in the engaged position.

11. The system of claim 7, wherein:
the collapsible portion includes a ledge; and
the tab of the base panel is configured to be located adjacent to the ledge to lock the collapsible portion in the engaged position.

12. A collapsible engagement mechanism, comprising:
a front panel;
a base panel connected to the front panel, the base panel including a tab;
a first side panel including a first engagement mechanism and connected to the front panel via a first hinge;
a second side panel including a second engagement mechanism and connected to the front panel via a second hinge; and
a collapsible portion including a slot, the collapsible portion connected to at least one of the first side panel and the second side panel, wherein the collapsible portion includes:
   a first collapsible panel connected to the first side panel; and
   a second collapsible panel connected to the second side panel;
   wherein the first and second collapsible panels are connected to each other via a third hinge; and
wherein:
   the collapsible portion is collapsible about the third hinge when the collapsible engagement mechanism is in a collapsed position;
   the collapsible portion is configured to be moved from the collapsed orientation to an over-center orientation such that the first side panel, the second side panel, and the collapsible portion are configured to rotate relative to the front panel and the base panel such that the collapsible engagement mechanism is in an engaged position to secure the collapsible engagement mechanism to an engagement structure; and
   the tab of the base panel is configured to be located in the slot to lock the collapsible portion in the engaged position.

13. The collapsible engagement mechanism of claim 12, wherein:
an angle between an inner side of the first side panel and an inner side of the front panel is less than ninety degrees when the collapsible engagement mechanism is in the collapsed position; and
an angle between an inner side of the second side panel and an inner side of the front panel is less than ninety degrees when the collapsible engagement mechanism is in the collapsed position.

14. The collapsible engagement mechanism of claim 13, wherein:
the angle between the inner side of the first side panel and the inner side of the front panel is greater than ninety degrees when the collapsible engagement mechanism is in the engaged position; and
the angle between the inner side of the second side panel and the inner side of the front panel is greater than ninety degrees when the collapsible engagement mechanism is in the engaged position.

15. The collapsible engagement mechanism of claim 12, wherein at least one of:
the first hinge is a snap hinge;
the second hinge is a snap hinge; and
the third hinge is a snap hinge.

16. The collapsible engagement mechanism of claim 12, wherein the first engagement mechanism and the second engagement mechanism are compressible.

* * * * *